Dec. 10, 1968  G. H. HOWLETT  3,415,552
SPLICING METALLIC REINFORCING RODS WITH A
THREADED COUPLING SLEEVE
Filed Nov. 29, 1966
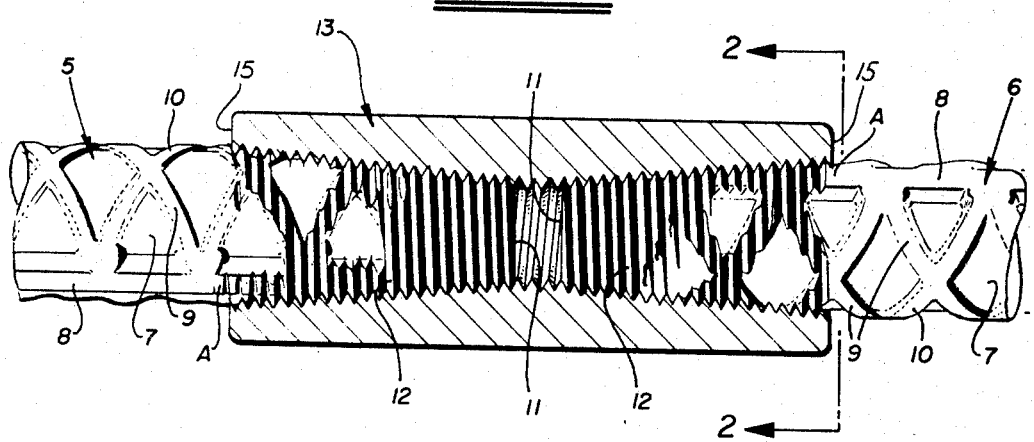
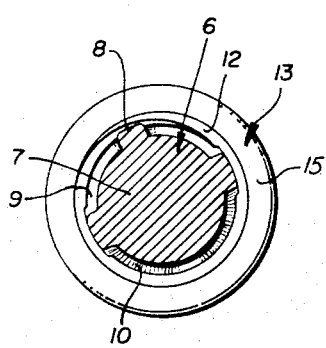
INVENTOR.
George H. Howlett
BY Warren, Brosler,
Cypher & Anglim
Attorneys

United States Patent Office 3,415,552
Patented Dec. 10, 1968

3,415,552
SPLICING METALLIC REINFORCING RODS WITH A THREADED COUPLING SLEEVE
George H. Howlett, Oakland, Calif., assignor to Howlett Machine Works, a corporation of California
Filed Nov. 29, 1966, Ser. No. 597,659
9 Claims. (Cl. 287—117)

ABSTRACT OF THE DISCLOSURE

Metallic reinforcing rods are spliced in coaxial relation by a rigid, internally threaded, coupling sleeve, the rod ends and sleeve having mating tapers and the threads on the rods extending into the central body portion of the rods near their ends and only into their ribs at points farther from the rod ends.

---

The invention relates to a metallic reinforcing rod for reinforced concrete formed to facilitate splicing it to another rod in spaced, coaxial relation, to a method of forming such a splice, to a spliced metallic reinforcing rod which comprises two such rods, and a metallic coupling sleeve. More particularly, the invention is concerned with reinforcing rods having central bodies of generally cylindrical outlines and ribs extending outwardly therefrom. The term "cylindrical" is used herein in its mathematical sense to include bodies that may have any desired cross section, such as circular, polygonal or elliptical, and the ribs may have any desired form, e.g., include one or a combination of the following: longitudinal ribs, annular ribs, helical ribs and opposed helical ribs. The invention will be illustrated as applied to bars using the first and last of these ribs in combination.

There is frequent need in erecting reinforced concrete structures to interconnect metallic reinforcing rods, also known as reinforcing bars, as when the length of a structure exceeds the lengths of individual rods that can be conveniently delivered to the construction site, or when the structure is erected in sections and it is desired that the rods project from the completed section for only a limited distance. Common methods are to overlap such joined rods, to clamp the rods, to make lap or butt welds, or to use couplers, for example, as described in my U.S. Patent No. 3,253,332. Overlapping rods are wasteful of metal and strength is transmitted only through the concrete; clamped connections are also wasteful of metal and fail to transfer the full stress in the rod; and welded connections are costly and time-consuming. The coupler of the cited patent, while overcoming some of these defects, is complex and more expensive to manufacture than the device of the present invention.

An ordinary threaded fitting such as a sleeve screwed onto the ends of conjoined rods, must be excessively long and therefore costly if it is to transmit sufficient stress to make the connection as strong as the rods.

Now according to the invention, there is provided a joint or splice that interconnects coaxial reinforcing rods rigidly and in a manner to transmit substantially all of the stress from one rod to another. The splice can be made stronger than the individual rods, can transmit compressive as well as tensile stress, and is easy to install. Moreover, in certain embodiments the splice can be made by rotating the coupling sleeve while the two conjoined rods do not rotate.

In summary, the splice according to the invention includes a pair of metallic reinforcing rods having central bodies and ribs which are formed with tapered end sections that have screw threads with corresponding tapers. The threads extending into the rod bodies at the rod ends but only into the ribs in the regions remote from the ends, and the tapered sections are screwed into a common cylindrical sleeve having a pair of tapered sections that become larger toward the ends of the sleeve and have correspondingly tapered threads.

By tapering the rod ends and the sleeve, the metal in the rods and sleeve is stressed more uniformly and a shorter sleeve can be used than would occur if helical threads (of uniform diameter) were used; and by extending the taper and thread back from the rod ends to the ribs, the full strength of the rods is developed in that stresses due to these ribs are also transmitted through the threads in the ribs directly to the sleeve. The increment of stress transmitted directly from the rib threads to the sleeve will vary in magnitude in accordance with the shapes and size of the ribs.

The invention will be described in detail with reference to the accompanying drawing forming a part of this specification, in which:

FIGURE 1 is a longitudinal sectional view through a spliced pair of rods, parts of the rod appearing in elevation; and FIGURE 2 is a transverse section taken on the line 2—2 of FIGURE 1.

Referring to the drawing in detail, which shows one illustrative embodiment, the composite reinforcing bar includes two separate, spaced, coaxial metallic reinforcing rods 5 and 6, each having a generally cylindrical central body 7 and ribs extending outwardly therefrom. In this example, each rod has a longitudinal rib 8 and opposed or double helical rib formed by ribs 9 and 10. Each rod has, at its end, a portion of the central body and ribs formed to provide a tapered coupling section, e.g., with a uniform taper from the point A to its end 11, and this tapered section is formed with correspondingly tapered screw threads 12. These threads extend radially into the central body throughout a plurality of turns, e.g., five to fourteen, but extend only into the ribs 8 through 10 in the region remote from the end 11. When uniform tapers are used the cone angle is typically 6° to 22°, e.g., 12° as shown, this angle being the total included angle between diametrically opposite surfaces. The length of each tapered section is preferably from 1.5 to 2.5 times the greatest diameter of the rod (including the ribs), although longer or shorter tapered sections may be used. The diameter of the end 11 varies in accordance with the cone angle and the length of taper and typically ranges between about 0.4 and 0.75 of the maximum diameter of the rod.

The tapers and the threads may be formed at the ends of the rods in a single operation using a cutter and threader, or the rods may be first tapered and then threaded; the rods may be rotated on their axis in a lathe or a rotating tool may be applied to the tools while the latter are clamped. The technique of forming the tapers and threads is obvious to persons skilled in the art and need not be stated herein, beyond indicating that these operations may be performed in the shop or in the field.

The two rods 5 and 6 are screwed into a rigid metallic coupling sleeve 13 having two tapered sections that diverge toward the ends of the sleeve and have cone angles to match the tapers on the rods. These sections of the sleeve have lengths equal to or slightly longer than the lengths of the tapered sections on the rods and have correspondingly tapered internal screw threads as shown. The sleeve 13 is preferably stronger at its central section, between the smallest ends 11 of the tapered sections on the rods than the rods. Thus, when the metal of the sleeve has the same unit strength as the rods, preferably the cross sectional area of the annular part of the sleeve at the ends of the rods is between about 1.1 and 1.7 times the total cross sectional area of one rod, measured at its untapered section. Further, the metallic coupling sleeve is advantageously formed of metal having a higher yield point than the rods.

It is evident that the tapered threads on the sleeve extend a few turns beyond the ends of the rods, to facilitate tightening the rods despite variations in the shapes of their tapered section. Usually the central bore of the sleeve is continuous, as shown; however, it is obvious that the two tapered sections of the sleeve need not be in communication.

According to one mode of fabricating the sleeve, it is formed of mild steel, e.g. of the type known as screw stock, is internally threaded, and then heat-treated to build up strength and harden the surface. When the strength of the steel in the sleeve exceeds that in the rods it is, of course, not necessary that the annular area of the sleeve in the section at the ends 11 of the rods exceed that of the total rod cross section. Moreover, it is an important feature of the present invention to form sleeve 13 from an alloy having sufficient unit strength so that ends 15 and the external diameter of coupler 13 are substantially flush with the external diameter of the rod as defined by ribs 9 and 10. Thus, a smooth continuous rod is achieved with the attendant advantages of close packing of a group of parallel rods and the ability to pass the rods through openings no larger than the rod.

The conjoined rods, together with the sleeve, shown in the drawing form a unitary reinforcing rod which is capable of transmitting both axial and tensile stress equal to or exceeding the strength of the rods. It is noted that the internal screw threads near the outer ends of the sleeve engage only the ribs; the very last turn or two of these threads may have diameters greater than the maximum diameter of the rod, as when the rod diameter is less than standard due to inaccuracies in manufacture.

In assembling the rods to the sleeve, the rods are first inserted into the sleeve and only a small number, such as three to eight turns of the rods suffices to seat them within the sleeve. A pipe wrench may be used to tighten them. Thus, the tapered section and coupler greatly facilitate assembly in the field.

In the embodiment shown right-hand threads were used throughout. In some situations, as when two pre-formed structures are to be interconnected by joining rods that project from the respective structure, it is not feasible to rotate the rods. In this situation the threads on one rod and in one corresponding section of the sleeve are right-hand and the remaining two sets of threads are left-hand. The rods are then tightened by merely rotating the sleeve.

Although the connection was shown as applied to reinforcing rods of like diameters and of circular outline, the invention may be applied to other sizes and shapes of rods. For example, the rods may have central bodies which are oval or polygonal; further, the rods may have different diameters. In the latter situation the maximum stress of the smaller rod only is transmitted to the larger rod, and it may be that, in this case, all of the threads in the larger rod enter the central body of the larger rod. Manufacturing techniques may cause substantial variance in the nominal diameters of the rod bodies and ribs even for rods which are designated as being the same size. When the rods are formed with the same end tapers and joined with the coupler of the present invention, it is possible to join rods of varying diameters in end-to-end relation. That is, a ¾-inch nominal diameter rod can be joined to a ⅞-inch nominal diameter rod by a sleeve coupler 13 formed with opposed uniformly tapering threaded bores. When the rods are formed from materials having different yield strengths, it can be highly advantageous to be able to join rods of different diameters by a single coupling having a standard internal taper. The coupling sleeve can be designed of an alloy such that the product of the unit strength of the alloy times the cross-sectional area of the annular part of the sleeve between the ends of the rods is at least about equal to, that is, is about equal to or greater than, the product of the cross-sectional area of the body of the rod times the unit strength of the rod. As was pointed out above, selection of the coupler material, and cone angle of the taper will allow the coupler to be fabricated of an external diameter substantially equal to the external diameter of the rod. Thus, coupler 13 is suitable for use in joining rods of a like or differing diameter and material.

I claim:

1. In a metallic reinforcing rod for concrete which includes a central body of generally cylindrical outline and ribs extending outwards from said body, the improvement of a portion of said central body and ribs providing a coupling section at an end of said rod, said section being tapered and formed with correspondingly tapered screw threads, a plurality of said threads extending into said portion of said central body adjacent to the end of the rod and the threads which are remote from the rod end and adjacent the cylindrical portion of said central body extending only into said ribs.

2. A reinforcing rod as defined in claim 1, and a second rod having the same definition as the first rod and positioned in spaced, end-to-end coaxial relation thereto, and a metallic coupling sleeve engaging and firmly interconnecting said rods, the inner surface of said sleeve having a pair of tapered sections which become larger toward the ends of the sleeve and are formed with correspondingly tapered screw threads which are in engagement with the threads on the rods.

3. A reinforcing rod according to claim 2 wherein the minimum cross sectional area of the annular part of the sleeve between the ends of the rods exceeds the cross sectional area of the body of one rod.

4. A reinforcing rod as defined in claim 2 wherein the external diameter of said sleeve is substantially equal to and flush with the external diameter of said rods including said ribs, said sleeve is formed from a material having a greater unit strength than said rod, and the product of minimum cross sectional area of the annular part of the sleeve between the ends of the rods and said unit strength is at least about equal to the product of the cross sectional area of the body of one rod and the unit strength of the rod.

5. A reinforcing rod according to claim 2 wherein all threads are of like hand.

6. A reinforcing rod according to claim 2 wherein the threads on one rod and in one section of the sleeve are right-hand and the remaining threads are left-hand.

7. A reinforcing rod as defined in claim 2 wherein said tapered sections on the rods and in the sleeve have cone angles between about 6° and 22°.

8. A reinforcing rod as defined in claim 2 wherein the length of each tapered section on the rods is between 1.5 and 2.5 times the maximum diameter of the rod.

9. A reinforcing rod according to claim 2 wherein one of said rods has a greater cross section than the other.

References Cited

UNITED STATES PATENTS

| 197,509 | 11/1877 | Abbott | 287—105 |
| 232,432 | 9/1880 | Allison | 285—333 |
| 1,078,007 | 11/1913 | Stange | 287—117 XR |

FOREIGN PATENTS

| 627,669 | 6/1927 | France. |
| 960,685 | 6/1964 | Great Britain. |

CARL W. TOMLIN, *Primary Examiner.*

ANDREW KUNDRAT, *Assistant Examiner.*

U.S. Cl. X.R.

52—737